United States Patent
Lin

(10) Patent No.: US 8,406,689 B2
(45) Date of Patent: Mar. 26, 2013

(54) HEADSET HAVING INFRARED EMITTER AND INFRARED RECEIVER

(75) Inventor: Tsung-Yu Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 431 days.

(21) Appl. No.: 12/817,153

(22) Filed: Jun. 16, 2010

(65) Prior Publication Data

US 2011/0249977 A1    Oct. 13, 2011

(30) Foreign Application Priority Data

Apr. 7, 2010    (TW) .............................. 99110694 A

(51) Int. Cl.
*H04B 7/00*    (2006.01)

(52) U.S. Cl. ........... 455/41.2; 381/74; 381/79; 381/370; 381/376; 381/367; 455/41.3

(58) Field of Classification Search ............. 381/74, 381/367, 371, 376, 370, 384, 79; 455/41.2, 455/41.3
See application file for complete search history.

(56) References Cited

U.S. PATENT DOCUMENTS

| | | | |
|---|---|---|---|
| 2007/0064311 A1* | 3/2007 | Park ............................ | 359/630 |
| 2007/0099574 A1* | 5/2007 | Wang ......................... | 455/67.11 |
| 2007/0223720 A1* | 9/2007 | Goldberg et al. .............. | 381/74 |
| 2008/0132294 A1* | 6/2008 | Bennett et al. ............... | 455/569.1 |
| 2010/0297946 A1* | 11/2010 | Alameh et al. .............. | 455/41.3 |

* cited by examiner

*Primary Examiner* — Disler Paul
(74) *Attorney, Agent, or Firm* — Altis Law Group, Inc.

(57) ABSTRACT

A headset includes a substantially U-shaped frame, two speakers mounted at two ends of the substantially U-shaped frame, an infrared emitter, and an infrared receiver facing the infrared emitter. The infrared emitter is configured for emitting infrared light towards the infrared receiver. The infrared receiver is configured for receiving the infrared light from the infrared emitter and for generating a pause signal after the infrared light is continuously received by the infrared emitter for a first predetermined time. The headset is configured to stop working according to the pause signal.

16 Claims, 5 Drawing Sheets

HEADSET HAVING INFRARED EMITTER AND INFRARED RECEIVER

BACKGROUND

1. Technical Field

The present disclosure relates to headset and more particularly, to headset having an infrared emitter and an infrared receiver to automatically achieve power-off function.

2. Description of Related Art

Nowadays, headsets, such as earphones, are widely used to play music. In operation, a typical headset is connected to a main device such as a computer or a digital video disk (DVD) player via a connecting line for receiving electrical signals. However, even when a user takes the headset off his head, the headset continues to work if the user forgets to turn off the audio player or pull out the connecting line from external device. Therefore, the headset is wasting power and the life of the headset is correspondingly decreased.

Therefore, a new headset is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various disclosed embodiments of the present disclosure in detail, wherein like numerals refer to like elements throughout.

Figure 1:
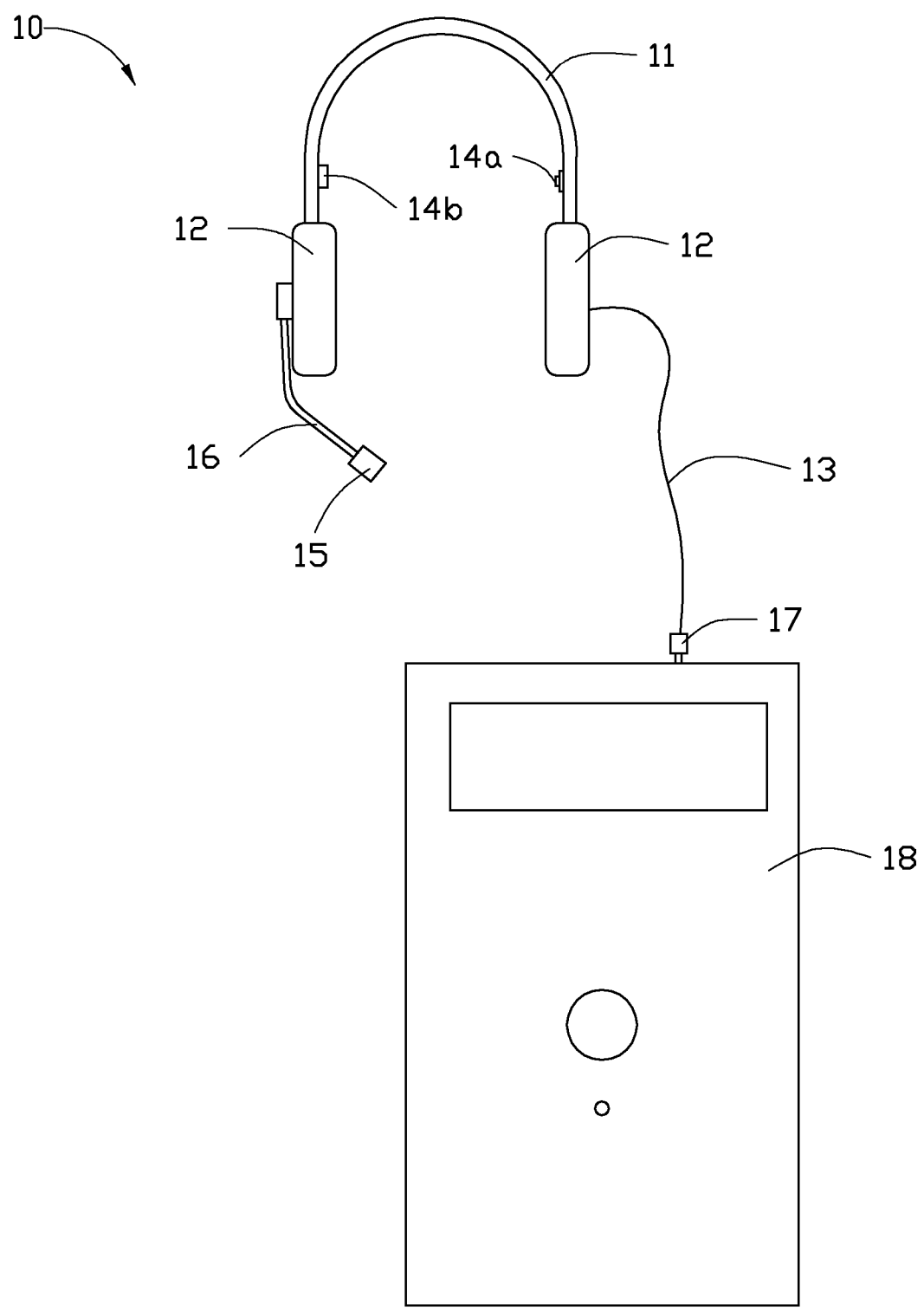
FIG. 1 is a schematic view of a headset according to a first embodiment of the present disclosure.

Referring to FIG. 1, a headset 10 according to a first embodiment of the present disclosure is shown. In this embodiment, the headset 10 are earphones which include a substantially U-shaped frame 11, two speakers 12, an infrared emitter 14a, and an infrared receiver 14b. The two speakers 12 are mounted at two ends of the substantially U-shaped frame 11.

The infrared emitter 14a and the infrared receiver 14b are positioned on internal surfaces of the two ends of the substantially U-shaped frame 11 facing each other. In this embodiment, the infrared emitter 14a is used to emit infrared light towards the infrared receiver 14b. The infrared receiver 14b is used to receive the infrared light from the infrared emitter 14a and generate a control signal accordingly if the infrared light is received from the infrared emitter 14a.

The headset 10 further includes a transmitting line 13, a microphone 15, a supporting arm 16, and a connector 17. One end of the supporting arm 16 is rotatably secured on an external surface of one speaker 12. The microphone 15 is fixed at the other end of the supporting arm 16. The connector 17 is electrically connected to an end of the transmitting line 13.

The headset 10 connects to an external main device 18 such as a computer or a DVD player via the transmitting line 13 and the connector 17.

Before being used, the connector 17 of the headset 10 is electrically connected to the external main device 18, which is powered on. The external main device 18 provides power supply and audio signals and/or video signals to the headset 10. Then the infrared emitter 14a starts to emit infrared light towards the infrared receiver 14b.

Because the user does not put the headset 10 on his head, the infrared receiver 14b can receive the infrared light from the infrared emitter 14a. If the infrared receiver 14b continuously receives the infrared light from the infrared emitter 14a for a first predetermined time, such as ten seconds, the infrared receiver 14b generates a pause signal and sends the pause signal to the external main device 18. The external main device 18 stops providing the audio signal and/or video signal to the headset 10 in response to receiving the pause signal.

When the user puts the headset 10 on, the infrared receiver 14b cannot receive the infrared light from the infrared emitter 14a because of the obstruction from the head. If the infrared receiver 14b does not receive the infrared light from the infrared emitter 14a for a second predetermined time, such as two seconds, the infrared receiver 14b generates a playing signal and sends the play signal to the external main device 18. The external main device 18 begins to provide the audio signal and/or video signal to the headset 10 when receiving the play signal.

Figure 2:
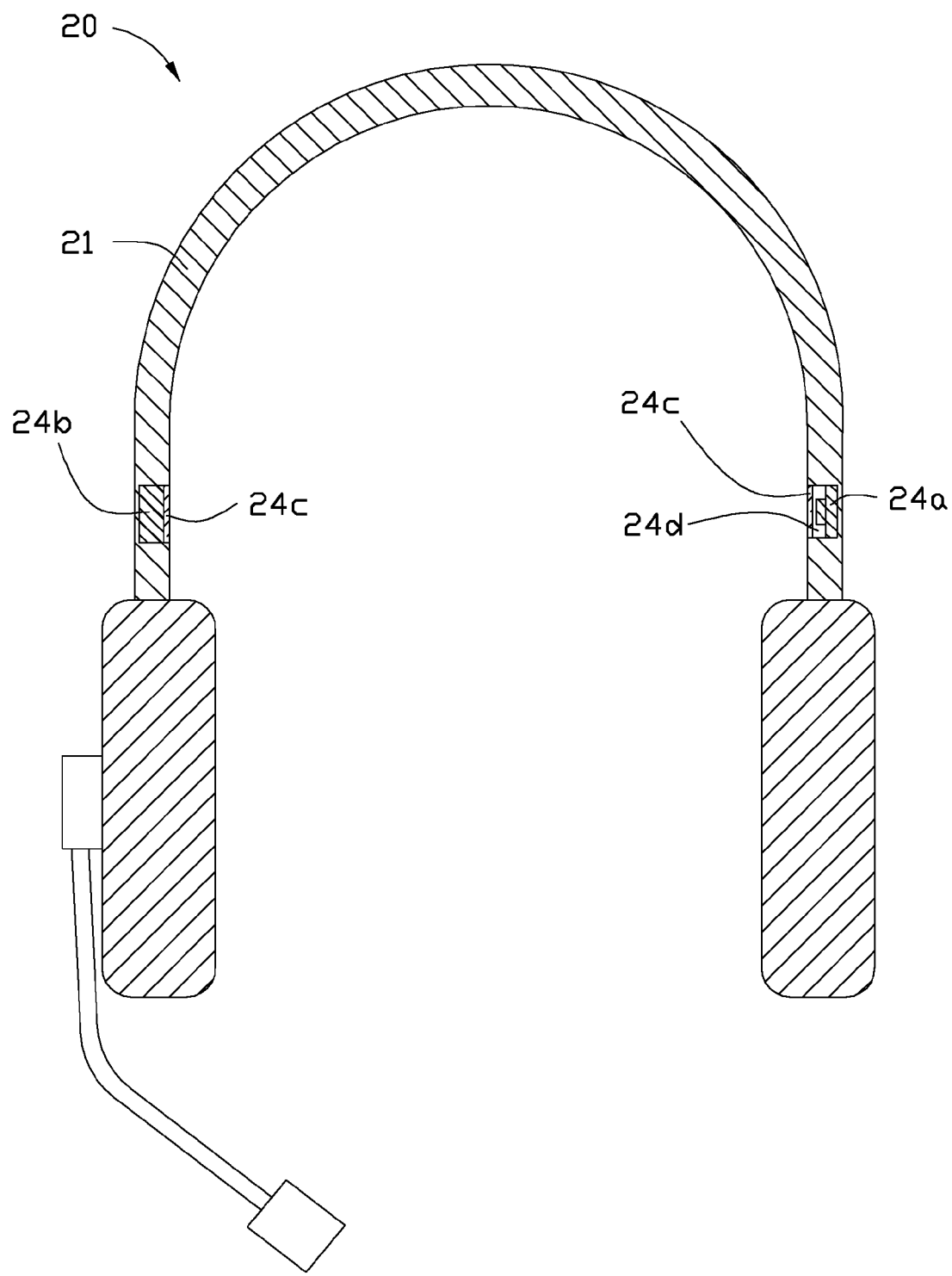
FIG. 2 is a schematic, enlarged perspective view of a headset according to a second embodiment of the present disclosure.

Referring to FIG. 2, a headset 20 according to a second embodiment of the present disclosure is shown. The headset 20 only differs from the headset 10 in that two recesses 24d define in opposite surfaces of two ends of the frame 21. An infrared emitter 24a and an infrared receiver 24b are respectively accommodated in the two recesses 24d. Two transparent covers 24a are further provided to seal the two recesses 24d for protecting the infrared emitter 24a and the infrared receiver 24b correspondingly.

Figure 3:
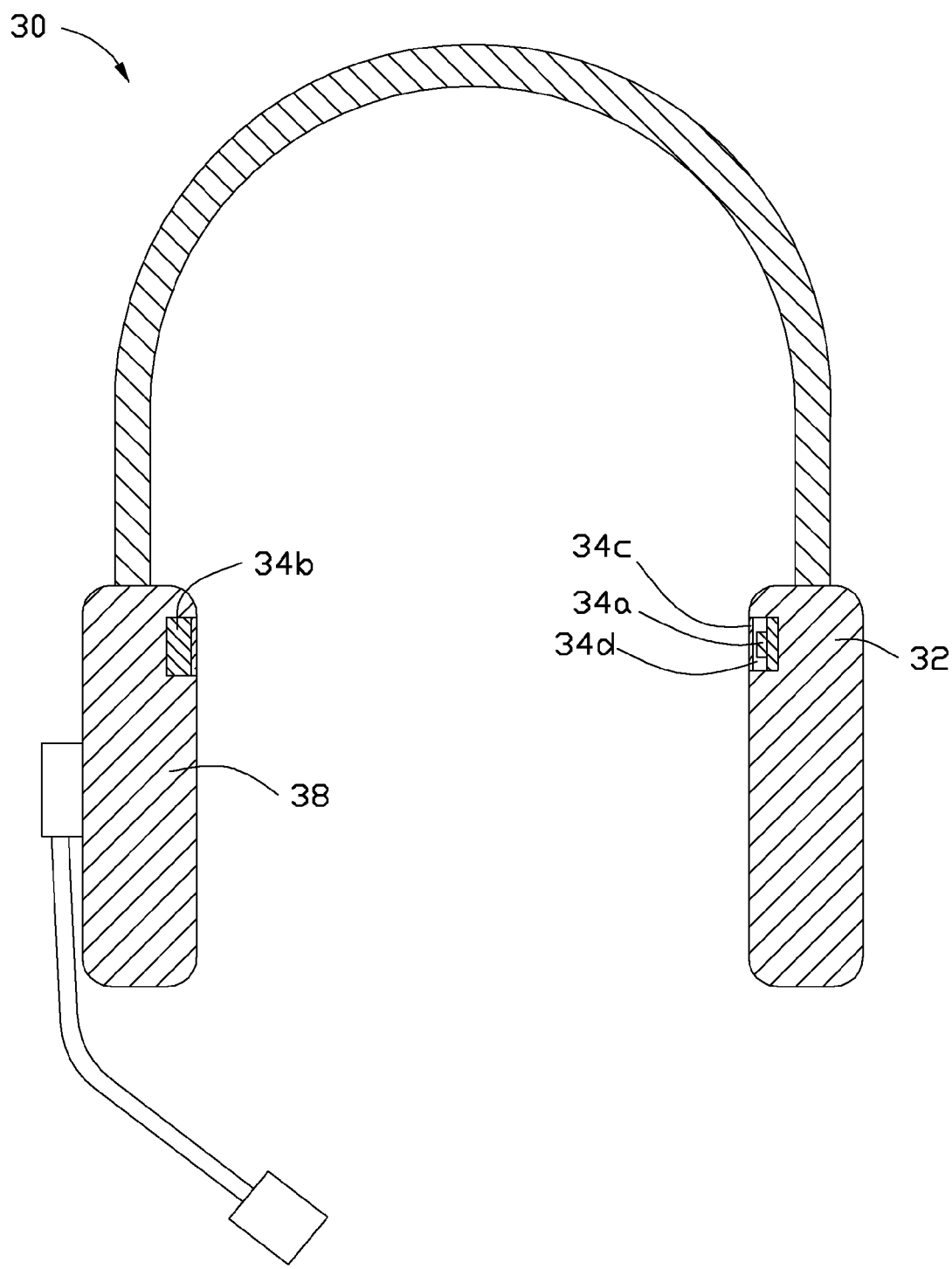
FIG. 3 is a schematic, enlarged perspective view of a headset according to a third embodiment of the present disclosure.

Referring to FIG. 3, a headset 30 according to a third embodiment of the present disclosure is shown. The headset 30 only differs from the headset 20 in that two recesses 34d define in opposite surfaces 38 of two speakers 32. An infrared emitter 34a and an infrared receiver 34b are respectively accommodated in the two recesses 34d. Two transparent or substantially transparent covers 34a are also provided to seal the two recesses 34d for protecting the infrared emitter 34a and the infrared receiver 34b correspondingly.

Figure 4:
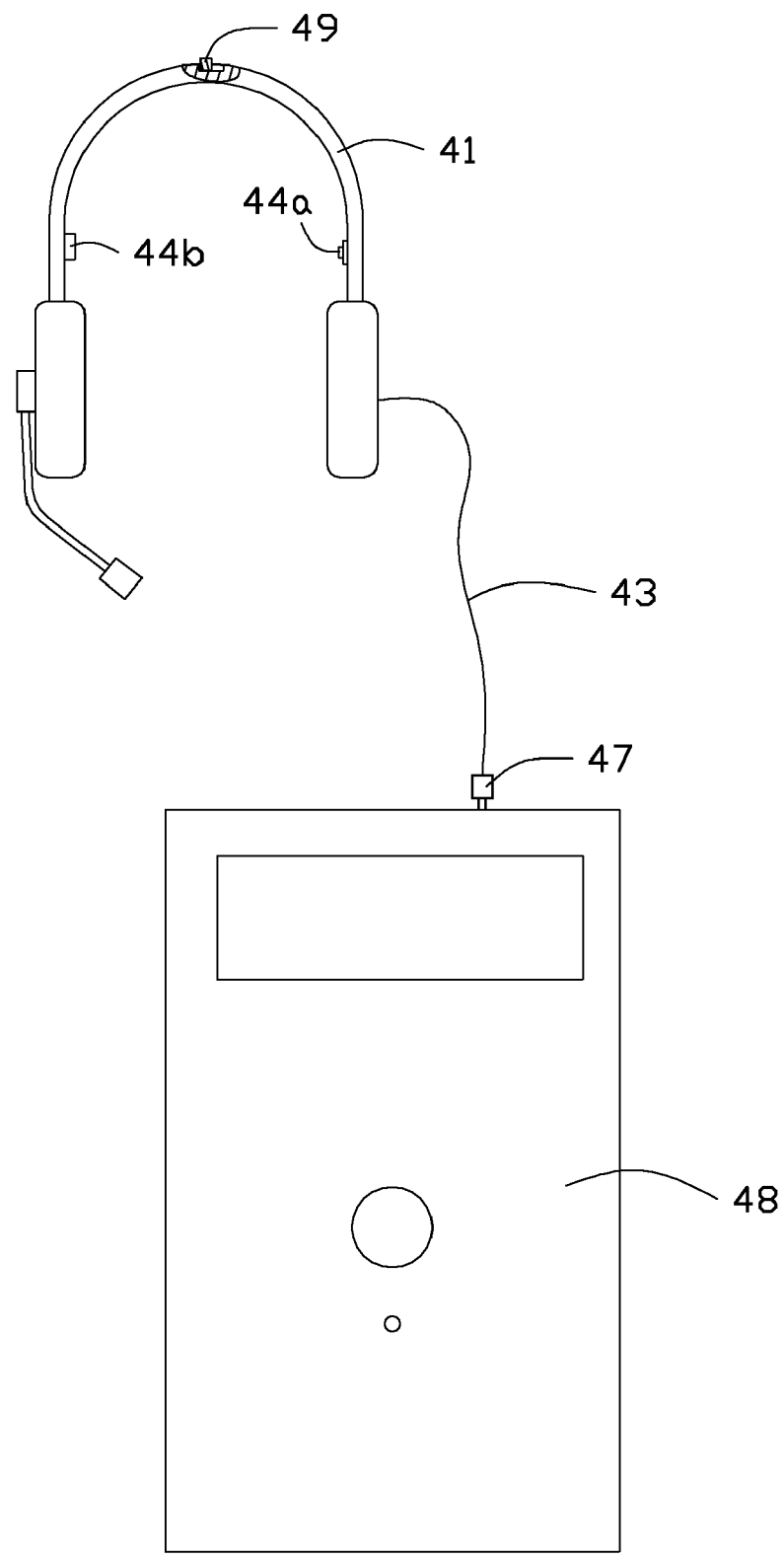
FIG. 4 is a schematic view of a headset according to a fourth embodiment of the present disclosure.

Referring to FIG. 4, a headset 40 according to a fourth embodiment of the present disclosure is shown. The headset 40 differs from the headset 10 in that the headset further includes a battery (not shown) imbedded in the frame 41 and a function switch 49 formed on the top of the frame 41. The battery functions as a power supply of an infrared emitter 44a and an infrared receiver 44b. The function switch 49 is used to select a first operation mode or a second operation mode of the headset 40. The operation of the headset 40 is the same as that of the headset 10 when the headset 40 works in the first operation mode.

When the headset 40 works in the second operation mode, before being used, a connector 47 of the headset 40 is electrically connected to an external main device 48, which is powered off and enters into a standby mode.

When user puts the headset 40 on, the infrared receiver 44b cannot receive the infrared light from the infrared emitter 44a because obstruction from the head. If the infrared receiver 44b receives no infrared light from the infrared emitter 44a for a third predetermined time, such as five seconds, the infrared receiver 44b generates a power-on signal and sends the power-on signal to the external main device 48. The external main device 48 powers on according to the power-on signal and begins to provide the audio signals and/or video signals to the headset 40.

After the user has taken off the headset 40, the infrared receiver 44b can once again receive the infrared light from the infrared emitter 44a. If the infrared receiver 14b continuously receives the infrared light from the infrared emitter 44a for a fourth predetermined time, such as five seconds, the infrared receiver 44b generates a standby signal and sends the standby signal to the external main device 48. The external main device 48 powers off and enters into a standby mode according to the standby signal to stop providing the audio signal and/or video signal to the headset 40.

In one alternative embodiment, the function switch 49 can further directly cut off an electrical connection between the headset 40 and the external main device 48.

Figure 5:
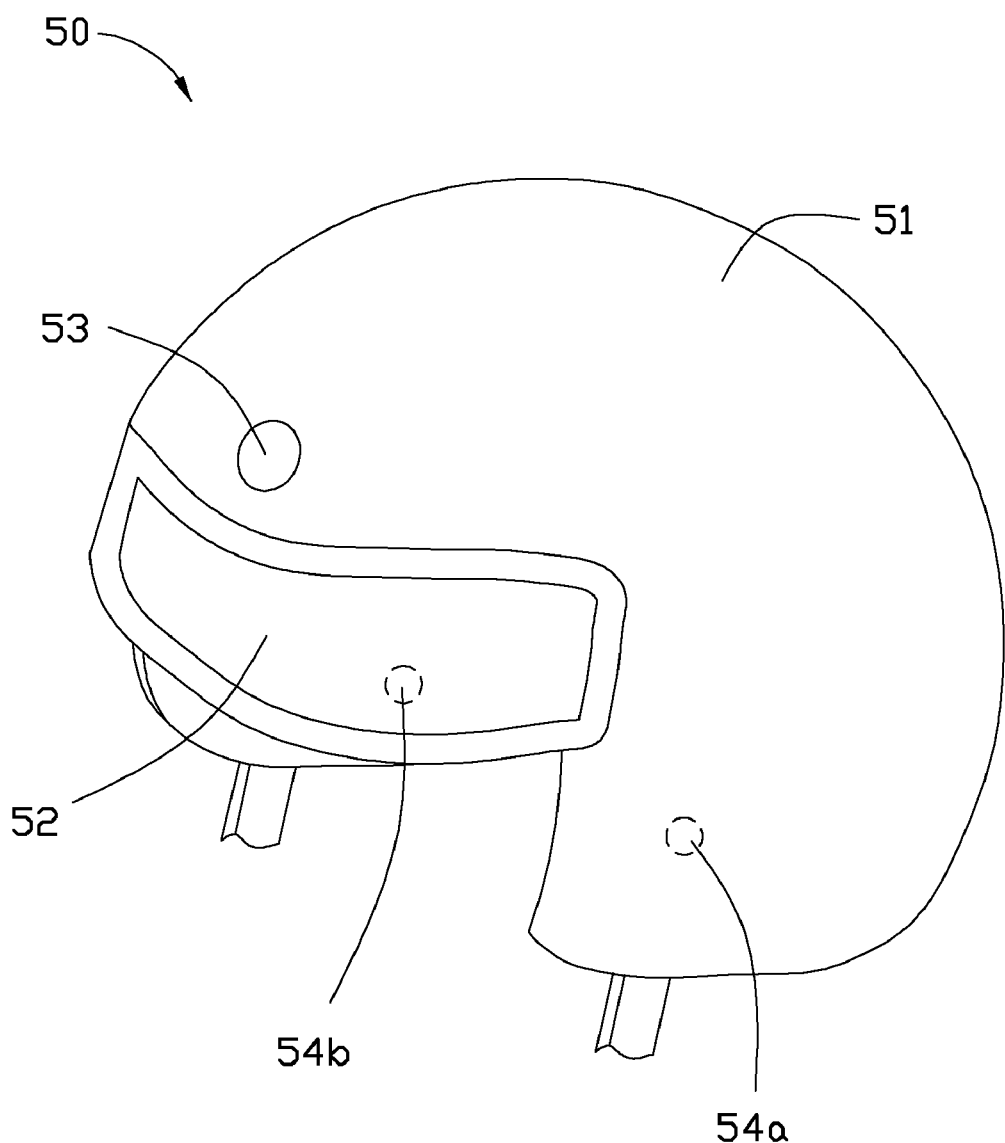
FIG. 5 is a schematic, isometric view of a headset according to a fifth embodiment of the present disclosure.

Referring to FIG. 5, a headset 50 according to a fifth embodiment of the present disclosure is shown. The headset 50 differs from the headset 10 in that the headset 50 includes an helmet 51, a display screen 52 and a projector 53 positioned in the front of the helmet 51, an infrared receiver 54b and an infrared emitter 54b are respectively formed at opposite internal sides of the helmet 51.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A headset, comprising:
a substantially U-shaped frame;
two speakers mounted at two ends of the U-shaped frame;
a transmitting line and a connector electrically connected to an end of the transmitting line, the headset connectable to an external main device via the transmitting line and the connector;
an infrared emitter; and
an infrared receiver facing the infrared emitter, the infrared emitter configured for emitting infrared light towards the infrared receiver, the infrared receiver configured for receiving the infrared light from the infrared emitter and generating a pause signal after the infrared light is continuously received by the infrared receiver for a first predetermined time, and the headset configured to stop working according to the pause signal; and the infrared receiver also configured for generating a playing signal and sending the playing signal to the external main device if the infrared receiver receives no infrared light from the infrared emitter for a second predetermined time.

2. The headset of claim 1, further comprising a function switch configured for cutting off an electrical connection between the headset and the external main device.

3. The headset of claim 1, further comprising a function switch configured to select a first operation mode or a second operation mode of the headset, the main device configured to stop providing audio signals and/or video signals to the headset in the first operation mode, and the main device also configured to power off and enter into an standby mode in the second operation mode.

4. The headset of claim 1, wherein the pause signal is configured such that when the pause signal is provided to the external main device, the external main device stops providing audio signals and/or video signals to the headset.

5. The headset of claim 4, wherein the first predetermined time is approximately equal to ten seconds.

6. The headset of claim 1, wherein the playing signal is configured such that when the playing signal is received by the external main device, the external main device provides the audio signals and/or video signals to the headset.

7. The headset of claim 6, wherein the second predetermined time is approximately equal to two seconds.

8. The headset of claim 1, wherein the infrared receiver is also configured for generating a power-on signal and sending the power-on signal to the external main device if the infrared receiver receives no infrared light from the infrared emitter for a third predetermined time.

9. The headset of claim 8, wherein the power-on signal is configured such that when the power-on signal is received by the external main device, the external main device powers on and provides audio signals and/or video signals to the headset.

10. The headset of claim 9, wherein the third predetermined time is approximately equal to five seconds.

11. The headset of claim 1, wherein the infrared receiver is also configured for generating a standby signal and sending the standby signal to the external main device the infrared receiver continuously receives the infrared light from the infrared emitter for a third predetermined time.

12. The headset of claim 11, wherein the standby signal is configured such that when the standby signal is received by the external main device, the external main device powers off and enters into a standby mode.

13. The headset of claim 12, wherein the third predetermined time is approximately equal to five seconds.

14. The headset of claim 1, further comprising two recesses defined in opposite surfaces of two ends of the U-shaped frame, the infrared emitter and the infrared receiver respectively accommodated in the two recesses.

15. The headset of claim 1, further comprising two recesses defined in opposite surfaces of the two speakers, the infrared emitter and the infrared receiver respectively accommodated in the two recesses.

16. A headset for electrically connecting to an external main device, comprising:
a helmet;
a screen and a projector positioned in the front of the helmet;
an infrared emitter and an infrared receiver formed at opposite internal sides of the helmet, the infrared emitter configured for emitting infrared light towards the infrared receiver, the infrared receiver configured for receiving the infrared light from the infrared emitter and generating a pause signal after the infrared light is continuously received by the infrared receiver for a first predetermined time, the headset configured to stop working according to the pause signal, and the infrared receiver also configured for generating a power-on signal and sending the power-on signal to the external main device if the infrared receiver receives no infrared light from the infrared emitter for a second predetermined time.

* * * * *